J. H. DORAN.
DASH POT.
APPLICATION FILED OCT. 17, 1917.

1,355,217.

Patented Oct. 12, 1920.

Inventor:
John H. Doran,
by Albert E. Davis
His Attorney.

UNITED STATES PATENT OFFICE.

JOHN H. DORAN, OF SCHENECTADY, NEW YORK, ASSIGNOR TO GENERAL ELECTRIC COMPANY, A CORPORATION OF NEW YORK.

DASH-POT.

1,355,217.   Specification of Letters Patent.   Patented Oct. 12, 1920.

Application filed October 17, 1917. Serial No. 197,159.

*To all whom it may concern:*

Be it known that I, JOHN H. DORAN, a citizen of the United States, residing at Schenectady, in the county of Schenectady, State of New York, have invented certain new and useful Improvements in Dash-Pots, of which the following is a specification.

The present invention relates to dash pots and particularly to dash pots intended for use in reducing axial vibrations of a rotating member which has a limited amount of axial play. One application of my invention is in connection with elastic fluid turbines for reducing axial vibrations of the rotor or rotors thereof, and it is particularly intended for use with radial flow turbines having oppositely rotating wheels in which the axial thrust is balanced by means of pressure disks upon which elastic fluid acts, the pressure increasing or decreasing on such disks when the wheels move axially to maintain such wheels in correct position.

The object of my invention is to provide an improved dash pot which will be simple to construct and very effective in operation.

For a consideration of what I believe to be novel and my invention, attention is directed to the accompanying specification and the claims appended thereto.

Figure 1:
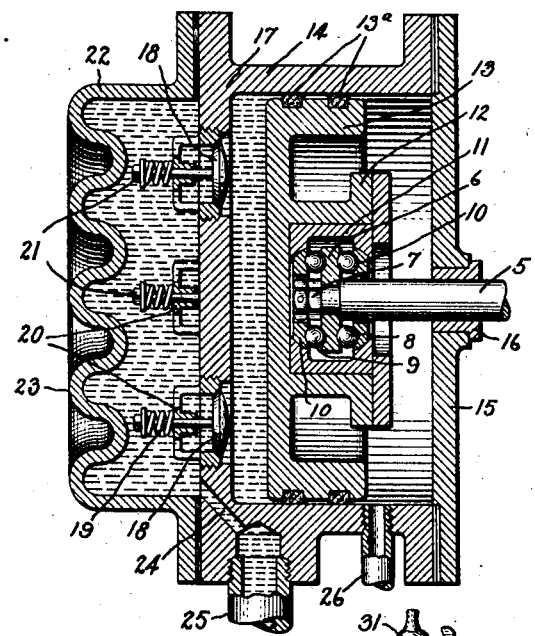
Figure 2:
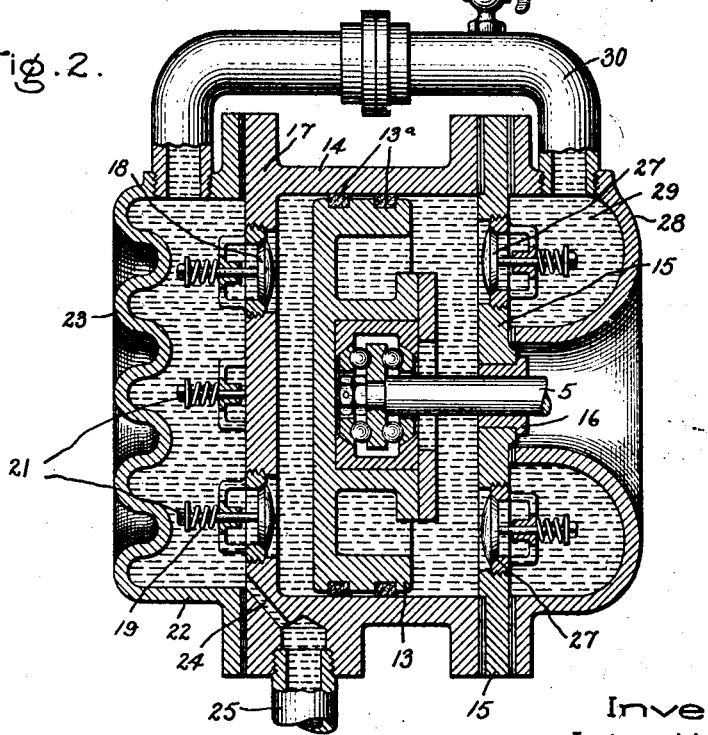

In the drawing, Figure 1 is a vertical sectional view of a dash pot embodying my invention, and Fig. 2 is a similar view of a modification.

Referring to the drawing, 5 indicates a rotating shaft which may be, for example, an extended end of a turbine rotor shaft or a separate shaft suitably coupled to a main rotor shaft. On its end is a thrust collar 6 held in position by nuts 7 and engaging on opposite side with rings of balls 8 and 9. The races for the rings of balls 8 and 9 are formed by annular grooves in opposite sides of the thrust collar 6 and by complementary annular grooves in disks 10 carried in a holder 11. The holder 11 is fixed in a housing 12 formed at the central portion of a piston 13 which slides in a cylinder 14. Between the cylinder and piston are suitable packing rings 13ª located in grooves in the piston. One end of the cylinder is closed by a plate 15 having a bearing sleeve 16 through which shaft 5 extends, and the other end is closed by the cylinder head 17. In cylinder head 17 are one or more valves 18 which are pressed to their seats by springs 19 and open toward the piston 13. Each spring 19 is located between a frame 20 which forms a guide for a valve stem and a nut and washer 21 on the end of such valve stem. Over the cylinder head 17 is fastened a casing 22 having a corrugated or fluted wall 23 which forms a sort of diaphragm which may be expanded and contracted by pressure. Communicating with the chamber within casing 22 is a passage 24 to which fluid under pressure, for example oil, is supplied through a pipe 25 which may lead from any suitable source. At 26 is a drain pipe which may lead to a suitable drain reservoir.

In operation fluid under pressure is supplied through pipe 25 and passage 24 and sets up a pressure in the casing 22. This causes the wall 23 to distend, giving it a tendency, when the pressure of the fluid on it is slightly decreased, to move toward the cylinder head 17. Fluid also passes through the valves 18 and fills the space between the head 17 and the end of the piston 13 so that the pressure on opposite sides of the valves 18 is substantially the same and the springs 19 hold them to their seats. Now if the rotor element vibrates axially such vibration will be transmitted to the piston 13 causing it to reciprocate back and forth. Such vibrations, however, will be quickly dampened out for on the slightest movement of the piston toward the right fluid under pressure will be quickly fed through the valves 18 thereby maintaining the pressure of the fluid on the face of the piston 13 and resisting its return movement toward the left. Return movement toward the left can only be affected by the piston forcing fluid by the piston rings 13ª and as these make a close fit, any quick movement toward the left will be prevented. Leakage past the piston rings 13ª is drained away by pipe 26. The purpose of the casing 22 having corrugated wall 23 is to always maintain a supply of fluid under pressure directly adjacent the valves 18 which fluid will be instantly pressed through the valves when the piston moves to quickly re-establish the pressure on the piston head. The corrugated wall being distended always exerts a pressure toward the cylinder head 17 and maintains the pressure within the chamber formed by casing 22. Due to this arrangement and the ample valve area provided by the valves 18, the apparatus is very sensitive and quick acting and a constant fluid pressure will be continuously maintained on the piston head, and also within casing 22.

The modification of Fig. 2 is similar to that of Fig. 1, except that fluid pressure is applied to both sides of the piston instead of to only one side. To this end the plate 15 is provided with valves 27 similar to valves 18, opening toward the piston and over the plate 15 is fixed a casing 28 forming an annular chamber 29 which is connected to the chamber within casing 22 by a conduit 30. In the conduit 30 is a vent valve 31 which may be opened to permit the escape of air. A wall of casing 28 may be corrugated similar to wall 23, or not, as found desirable. The operation of this arrangement is the same as that of Fig. 1, except that, of course, fluid is forced in on both sides of the piston following its movement both back and forth.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. In a dash pot, the combination of a cylinder having a head, a piston in the cylinder, a valve in the head of the cylinder which opens toward the piston, a wall forming a chamber in front of the cylinder head, means for supplying fluid, to said chamber, and means for maintaining said fluid in the chamber under pressure whereby when the piston moves fluid will be quickly forced through said valve.

2. In a dash pot, the combination of a cylinder having a head, a piston in the cylinder, a valve in the head of the cylinder which opens toward the piston, a wall forming a chamber in front of the cylinder head, means for supplying fluid under pressure to said chamber, and means which exerts a pressure on the fluid tending to force it through the valve.

3. In a dash pot, the combination of a cylinder having a head, a piston in the cylinder, valve means in the head which opens toward the piston and is biased to closed position, a casing having a distendable wall which fits over the cylinder head to form a chamber, and means for supplying fluid under pressure to said chamber.

4. In a dash pot, the combination of a cylinder, a piston therein, end walls for the cylinder, valves in said walls which open toward the piston, walls forming chambers in front of each of said end walls, means for supplying fluid, to said chambers, and means for maintaining said fluid in the chambers under pressure whereby when the piston moves fluid will be quickly forced through said valves.

5. In a dash pot, the combination of a cylinder, a piston therein, end walls for the cylinder, valves in said walls which open toward the piston, casings forming chambers in front of each of said end walls, means for supplying fluid under pressure to said chambers, and means which exerts a pressure on the fluid tending to force it through the valves.

6. In a dash pot, the combination of a cylinder, a piston therein, end walls for the cylinder, valves in said walls which open toward the piston, casings forming chambers in front of each of said end walls, a wall of at least one of said chambers being adapted to be distended, and means for supplying fluid under pressure to said chambers.

7. In a dash pot, the combination of a cylinder, a piston therein, end walls for the cylinder, valves in said walls which open toward the piston, casings forming chambers in front of each of said end walls, a wall of one of said casings being adapted to be distended, a conduit connecting said chambers together, and a conduit for supplying fluid under pressure to one of said chambers.

8. The combination with a rotating shaft susceptible of axial vibrations, of means for dampening such vibrations comprising a piston connected to the shaft, a cylinder in which the piston may move, a head for the cylinder, valve means in the head, a casing forming a chamber in front of the head, and means for supplying fluid under pressure to said chamber, said casing comprising means which exerts a pressure tending to force fluid through the valves.

In witness whereof, I have hereunto set my hand this 16th day of October, 1917.

JOHN H. DORAN.